United States Patent
Majer

(10) Patent No.: US 9,993,106 B2
(45) Date of Patent: Jun. 12, 2018

(54) DEVICE AND METHOD FOR PREPARATION OF BEVERAGES WITH DIFFERING TASTES

(75) Inventor: Luca Doglioni Majer, Carate urio (IT)

(73) Assignee: TUTTOESPRESSO S.r.l., Origgio (IT)

( * ) Notice: Subject to any disclaimer, the term of this patent is extended or adjusted under 35 U.S.C. 154(b) by 247 days.

(21) Appl. No.: 13/701,334

(22) PCT Filed: May 31, 2011

(86) PCT No.: PCT/IB2011/001190
§ 371 (c)(1),
(2), (4) Date: Jan. 30, 2013

(87) PCT Pub. No.: WO2011/151703
PCT Pub. Date: Dec. 8, 2011

(65) Prior Publication Data
US 2013/0129885 A1    May 23, 2013

(30) Foreign Application Priority Data

May 31, 2010   (WO) .................. PCT/IB2010/001300

(51) Int. Cl.
*A47J 31/40*     (2006.01)
*A47J 31/00*     (2006.01)
(Continued)

(52) U.S. Cl.
CPC .......... *A47J 31/407* (2013.01); *A47J 31/002* (2013.01); *A47J 31/36* (2013.01); *A47J 31/368* (2013.01); *A47J 31/46* (2013.01)

(58) Field of Classification Search
CPC .......... A47J 31/46; A47J 31/36; A47J 31/402; A47J 31/407; A47J 31/56; A47J 31/0668;
(Continued)

(56) References Cited

U.S. PATENT DOCUMENTS 5,579,678 A    12/1996   Goerndt
8,770,094 B2    7/2014   Rithener et al.
(Continued)

FOREIGN PATENT DOCUMENTS

EP   0870457 A1   10/1998
EP   2071960 A1    6/2009
(Continued)

OTHER PUBLICATIONS

International Search Report dated Jun. 21, 2012 in PCT/IB11/01190 Filed May 31, 2011.
(Continued)

*Primary Examiner* — Lien T Tran
*Assistant Examiner* — Hong T Yoo
(74) *Attorney, Agent, or Firm* — Oblon, McClelland, Maier & Neustadt, L.L.P.

(57) ABSTRACT

A beverage dispensing machine includes: a first hydraulic circuit including a water source, a pump, a water heater, a brewing device selected from a brewing chamber and a capsule, the brewing device including an inlet and outlet, a beverage collector collecting brewed beverage leaving the brewing device and for dispensing the beverage to a container; and a second hydraulic circuit that includes a second pump and second water heater, the outlet of the second water heater being connected to the first circuit at a location that is downstream to the brewing device with respect to the water flow in the first circuit. The first circuit can maintain in the brewing device a pressure substantially constant for a pre-set time, the pressure being less that an opening pressure for the brewing device.

20 Claims, 4 Drawing Sheets

(51) Int. Cl.
*A47J 31/36* (2006.01)
*A47J 31/46* (2006.01)

(58) Field of Classification Search
CPC .......... A47J 31/401; A47J 31/40; A47J 31/32;
A47J 31/0573; A47J 31/24
See application file for complete search history.

(56) References Cited

U.S. PATENT DOCUMENTS

| | | |
|---|---|---|
| 2003/0126993 A1 | 7/2003 | Lassota et al. |
| 2005/0274738 A1 | 12/2005 | Tomsic et al. |
| 2009/0136639 A1 | 5/2009 | Hajer |
| 2010/0003022 A1 | 1/2010 | Reyhanloo |
| 2010/0266740 A1 | 10/2010 | Van Den Aker et al. |
| 2011/0030564 A1* | 2/2011 | Cocco .................. A47J 31/3671 99/323.3 |

FOREIGN PATENT DOCUMENTS

| | | | |
|---|---|---|---|
| WO | 2006 121514 | 11/2006 | |
| WO | 2007 110768 | 10/2007 | |
| WO | WO 2009130661 A2 * | 10/2009 | .......... A47J 31/3671 |

OTHER PUBLICATIONS

Chinese Search Report issued for corresponding Chinese Patent Application No. 201180035258X, with English Translation of Categories of Cited Documents (3 pages).

* cited by examiner

DEVICE AND METHOD FOR PREPARATION OF BEVERAGES WITH DIFFERING TASTES

FIELD OF THE INVENTION

The present application relates to a method for obtaining differing types of beverages. The invention relates also to a device for dispensing said beverages by carrying out the invention method.

In particular, the present invention relates to a dispensing machine, for use at home, in a professional environment (restaurant, coffee-bar, airport-lounge etc.) or in a work-environment (conference room, office, petrol-station etc.), and suitable to dispense drinks of widely different liquid content and nature.

BACKGROUND OF THE INVENTION

There are two basic ways of preparing a drink from a dispensing machine:

by using single-portion cartridges, or paper pods, or "capsules" which are pre-packaged containers of ingredient either instant (such as for instance a cappuccino pre-mixed water-soluble powder, or powdered milk) or fresh (such as roast and ground coffee, or mint-tea, or yerba mate), or liquid (such as a chocolate or coffee concentrate);

by using the same or similar ingredients in a preparation or brewing chamber, which is usually but non necessarily sealable and performing its function under pressure.

Both system use inlet and outlet means respectively for the solvent and for the prepared drink, which may be easy to devise for the skilled in the Art.

The present invention relates to both types of drink preparation methods.

Patent application no. US2007/248734(A1) exemplifies one recurrent theme found in several other patents, including application no. WO2007/063411 by the Applicant: that is methods to increase the amount of froth in a coffee-based or other drinks. Nothing is mentioned about the opposing aim to reduce to its maximum the froth formation, which is considered a draw-back in these applications which seek methods to create a frothy espresso.

Patent applications U.S. Pat. No. 518,696 (A), IT1257648 (B) or WO2005/107540 describe machines dispensing both regular coffee and espresso coffee but they do so through the use of so-called "combined technology", that is to separate preparation chambers: one adapted to accept loose grounds or paper-pods and one suitable for preparing filter-coffee with "drip-type brewing chamber", utilising the same hydraulic connection. The dispensing units, thus, do not adapt rather provide totally different methods of preparation of the drinks, which in turn generate higher costs, increased maintenance needs, more complicated mechanical and hydraulic construction.

Patent application no. WO2007/110768 A2 by the Applicant describes a process to achieve increased extraction levels of the soluble components of the primary ingredient such as ground coffee and obtain differing levels of froth formation. Although it serves such purpose, such invention is limited in the sense that it assumes limited parameters to control the brew quality.

U.S. Pat. No. 6,786,134 discloses a brewing system that includes two water feeding circuits, one for brewing the beverage and a second for adding hot or cold water to the collecting means for the brewed beverage; a single hot water reservoir is provided for both the first and the second circuit and a heat exchanger that is part of the first circuit is immersed in the reservoir for heating the water of the first circuit required for the brewing step. Thus, the temperature of the dilution water in the second circuit is substantially the same as the temperature of the water in the first circuit, or brewing circuit; this reduces the possibility of having differently tasting beverages.

US 2003126993 refers to a brewing system similar to the system of U.S. Pat. No. 6,786,134, having two circuits: one for feeding hot water to the brewing chamber and one for feeding cold water to the beverage collecting means.

A drawback of the known methods comes from the need of preparing drinks of widely different nature, yet using the very same dispensing machine. This is the case for instance—limiting just for instance to coffee, but similar observations are valid for teas, chocolates or fruit juices—of "regular" American coffee having water volumes (or "throws") up to 10 (approx. 295 cc.), 12 (approx. 354 cc.) or even 20 fl. oz. (approx. 590 cc.), European-styled "lattes" with 7, 9 or 10 fl. oz. and more, and Southern European "ristretto" espresso coffees bearing water "throws" as little as 40, 30 or even 20 or 15 cc.

Another problem of the known art relates to the need of dispensing drinks with different froth level, such as is the case with a chocolate or cappuccino pre-mix drink, an espresso coffee (with froth), a regular coffee, or a leaf-tea or herbal infusion (without froth). A still further problem is related to the need for a dispensing machine to adapt to different market needs thus managing different dilution ratios expressed for instance by the amount of grams of fresh ingredient, or the amount of powdered ingredient, or the mix of the aforementioned ingredients, used for the preparation of a drink of varying water volume. Another problem is related to the differing organoleptic results deriving from running differing amounts of water through a certain ingredient, particularly when said ingredient is prone to increasing depletion of its soluble contents and varying quality of the obtained beverage.

SUMMARY OF THE INVENTION

It is an aim of the present invention to solve the above mentioned problems by providing a dispensing unit and a dispensing method that manages the aforementioned variables in a fashion that allows for the creation of drinks which are suitably adapted to widely different needs of the ever-changing customer-base of a drinks-dispensing unit. Another aim of the invention is to provide a device and a method for obtaining drinks bearing differing amounts or "throws" of water, differing amounts of froth or "crema" and differing relationships between the amount of ingredient and of solvent, such as water or milk.

Such aims are reached by means of the present invention, that provides a beverage dispensing machine according to claim 1, i.e. a machine comprising a first hydraulic circuit (or primary circuit, or brewing circuit) including a water source, a pump, a water heating means, a brewing means selected from a brewing chamber and a capsule, said brewing means having inlet and outlet means, beverage collecting means for collecting brewed beverage leaving said brewing means and for dispensing said beverage to a container, characterized in further comprising a second hydraulic circuit (or dilution circuit) that includes a second pump and second water heating means, said water heating means being different and separate from the water heating means of the first circuit, and wherein the outlet of said water heating means being connected to said first circuit at a location that is downstream to the said brewing means with respect to the water flow in said first circuit.

With "brewing means" it is meant to identify also preparation chambers for soluble products, e.g. a capsule containing powdered or/and liquid soluble products.

The invention device is further comprising control means to operate said second circuit as a function of said first circuit flow-rate.

Preferably, the first circuit comprises flow-rate control means and said second circuit comprises flow-rate metering means. In another preferred embodiment, control means are provided to control the flow-rate of said second circuit according to the detected flow-rate value in said first circuit so that a pre-determined relationship is maintained using the former flow-rate as dependant variable of the latter flow-rate.

The outlet of the second circuit preferably feeds water (and/or another edible liquid) to the beverage delivery means to exit said means together with the beverage prepared in and eluting from the first circuit.

The invention also relates to a dispensing method according to claim 5, i.e. a method wherein in addition to the known beverage preparing steps, there are also comprised the steps of feeding further water and/or other edible liquid to said first hydraulic circuit at a position located downstream to the said brewing means with respect to the water flow in said first circuit.

In this method, the flow-rate of said second circuit is preferably controlled according to the pre-set or detected flow-rate value in the first circuit so that a pre-determined relationship is maintained using the former flow-rate as dependant variable of the latter flow-rate.

In a preferred embodiment, the beverage collecting means has froth reduction means located in the collecting means 6 or in any case before the exit of the collecting means into the cup. The preferred granulometry range of the ground coffee particles is within the range of 150 to 500 nm, preferably 280 to 400 microns and most preferably of 290 to 350 μm.

Preferably, the second circuit above discussed is used in combination with a first circuit as here below disclosed, i.e. a circuit provided with means for maintaining a reduced constant pressure in the brewing means before and/or after the opening of the brewing means, especially a capsule.

With the wording constant pressure it is identified a pressure that can vary up to 10% above or below the set value. Said pressure is inevitably subject to adjustment by the machine.

A preferred capsule for use in the first hydraulic circuit is the one disclosed in PCT/IB2006/003462 (EP 06821023.6), but other capsules that are normally closed when water is initially fed, and that are subjected to an internal pressure increase before opening, can be advantageously used with the invention machine.

As a matter of fact, the invention also relates to a beverage dispensing machine according to claim 12, comprising a first hydraulic circuit including a water source, a pump, a water heating means, a brewing means selected from a brewing chamber and a capsule, said brewing means having inlet and outlet means, beverage collecting means for collecting brewed beverage leaving said brewing means and for dispensing said beverage to a container, further comprising a means to maintain a substantially constant pressure of the water in said brewing means. As above mentioned, brewing means also identifies preparation chambers for liquid or powdered soluble products. Preferably, the pressure maintaining means comprises a branched line connected with an inlet to said first hydraulic circuit downstream of said pump, with respect to the water flow in said circuit, and with an outlet at a location upstream of said pump, with respect to the water flow in said circuit. In the preferred embodiment, the branched line is connected to the line going from the pump to the heater (boiler) for the water and forms a by-pass of the pump.

The outlet of the branched line can be connected with the water reservoir or with the line feeding water to the pump, or with any suitable part of the machine.

In a preferred embodiment, the first hydraulic circuit is equipped with pressure-control means and valve means to controllably feed water to said branched line upon reaching a preset pressure value in said circuit downstream of said pump. The constant pressure maintaining means are used both in pre and in post capsule (or chamber) opening steps; namely the method envisages to maintain the filled and closed brewing means at a constant pressure, lower than the opening pressure of the brewing means. A pre-opening treatment enhances the extraction of the ingredient, a post-opening treatment avoids or dramatically reduces the amount of froth in the final beverage.

The invention provides several advantages over the prior art machines.

The invention second circuit can be used as a complement to any known beverage preparation first (or primary) circuit to provide either a regular (or americano or filter) coffee or an espresso coffee, from the same starting material, such as ground coffee, in a capsule or in a brewing chamber.

This results in the great advantages of requiring only one type of grinder in those machine having a brewing chamber in which loose coffee particles are fed and that only one type of capsules is required in those machines that use capsules, to prepare all types of preparations in different formats and volumes.

The first circuit can be used in any known beverage dispensing machine and gives the advantage of an improved wetting of the coffee cake (compressed) with better extraction of the aroma products and, in particular, of avoiding or dramatically reducing the formation of froth in the dispensed beverage.

Having two separate and different heating means for the two circuits makes it possible to obtain a wide range of different tastes in the final beverage; in fact, the invention makes it possible to change the temperature of the first circuit with respect to the temperature of the second circuit and to adapt both temperatures and volumes of the liquids dispensed by the two circuits according to the required taste of the final beverage. Thus, the same coffee can give many different beverages.

A further advantage is that the invention machine can provide several different types of beverages: e.g. the second circuit can provide also hot or cold milk for "lattes".

BRIEF DESCRIPTION OF THE FIGURES

These and further advantages will be evident from the following description in which.

DESCRIPTION OF THE PREFERRED EMBODIMENTS

Drinks object of this Application pertain to the type of drinks using one or more main ingredients (such as leaf-tea or other herbal remedies, roasted coffee, concentrated ingredients in liquid form such as chocolate syrups or condensed milk or fruit-based ingredients, soluble powders such as freeze-dried coffee or cappuccino pre-mixes) plus a solvent, usually water but also other solvents, such as liquid milk or prepared infusions, which may be used hot, that is above 60° C. (and below or around 100° C.) or even below such temperature, such as a room temperature or cold milk at 7° C. In the following description reference will be made to water as this is the generally used solvent, without limiting the scope of the application to water only.

The Applicant's research started from the fact that coffee and other drink ingredients suffer a progressive depletion of their soluble constituents, which are dissolved with relatively low-temperature solvents in order to prepare a drink. An uneven exploitation of the ingredient was found to be particularly noticeable in espresso preparations, because of the tight compression of the cake: in this preparation successive volumes of water tend to exhaust the content of solubles on a limited surface/volume of the coffee cake (along a limited amount of water paths), thus increasing the bitterness and overall strength of the finished drink to the detriment of the taste and aroma.

Figure 1:
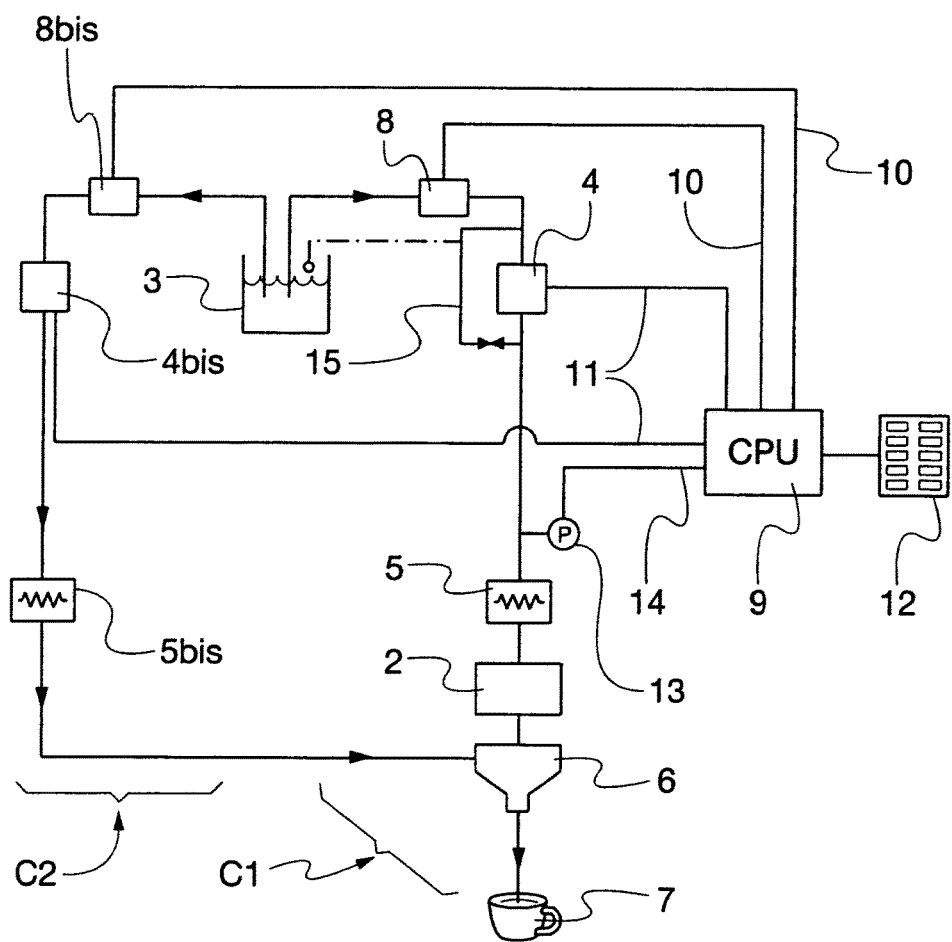
FIG. 1 is a scheme of a possible embodiment according to the invention.

In this search, the Applicant has also evaluated the differing quality of the brew when different fractions of the same brewing cycle are compared, whereby it was found that the first eluted fractions are evidently darker, stronger and bearing higher organoleptic values than the later fractions leaving the brewing or preparation means. With reference to FIG. 1, the beverage dispensing machine 1 of the invention comprises a first hydraulic circuit C1 and a second hydraulic circuit C2. The first circuit comprises a brewing means 2 that is selected from a capsule and a brewing chamber. With "capsule" it is made reference to capsules, cartridges or pods or more generically a pre-packaged container of the main ingredient(s) with appropriate inlet and outlet means to allow the contact under pressure of water (or other edible solvents) for the preparation of a drink. Alternatively the brewing means is a brewing or preparation chamber, apt to accept said ingredient(s) in loose form, in which case the dispensing unit comprises also appropriate dispensing and metering methods known to the skilled in the Art. For the present description, reference will be made to capsule, but this word will also include a brewing chamber and brewing means in general.

The first circuit C1 comprises also a water source 3 such as e.g. a reservoir or feed-line, a pump 4 and a heater or boiler 5 for heating the water to the required temperature.

The pump 4 is suitable for injecting water into the brewing means 2 under pressures between 0.3 and 25 bars, preferably between 1 and 20 bars; suitable pumps are known in the art, e.g. of rotative, centrifugal, peristaltic or vibration type, or air or vacuum pumps.

The heater 5 is located between the pump and the brewing means 2; it is known in the art and is e.g. selected from a pressure-boiler, an open boiler, or a so-called "flash-heater" or instant-heater. In addition there also may be provided means (not shown) for cooling and regulating the water temperature such as a chilling conduit, chiller-tank, or flash-chiller. The brewing means 2 is provided as mentioned, with inlet means and outlet means as well as optional filtering means available at the skilled in the Art, that is if they are needed for the preparation of the required drink, as is the case with ground coffee.

The brewing chamber or capsule 2 is connected, e.g. housed in the case of a capsule, to beverage collecting means 6 that, in turn, deliver the beverage leaving brewing means 2 to a cup or other beverage container 7.

Figure 7:
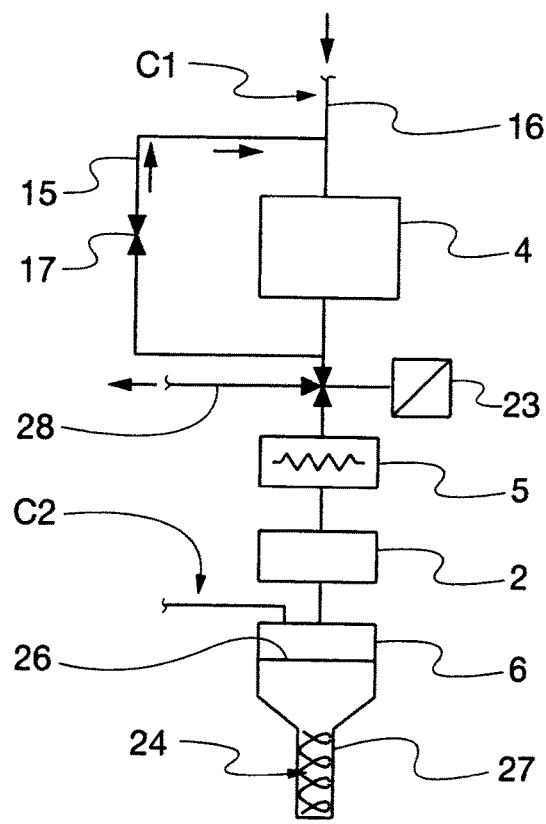
FIG. 7 is a scheme of a portion of the dispensing machine according to another embodiment of the invention.

In a preferred embodiment, the device according to the present invention comprises froth reduction means located in the collecting means 6 or in any case before the exit of the collecting means into the cup. Said froth reduction means are for example selected from a filter 26 capable of breaking down the froth and an additional duct or an insert 24 housed in the outlet duct 27 of the collecting means 6, or their combination. The purpose of said duct or insert 24 is to extend the path that the beverage has to follow before leaving the collecting means 6 so as to reduce the froth. The filter 26 could be metallic, paper or a non-woven fabric such as those used in diapers, in particular the non-woven fabric for fluid distribution. The insert 24 is schematically shown in FIG. 7 and has the shape, e.g., of a screw. When an insert/filter is provided, a final elution of water is preferably carried out at the end of the dispensing cycle. Additional froth reduction can, be obtained by a pressure reduction in the capsule during the brewing step, as is hereinafter discussed in greater detail before example 2.

According to a first embodiment of the invention, in order to be able to dispense beverages having a volume within the range from 15 ml to 600 cc, the invention dispensing machine is provided with an additional second circuit C2, that includes a second pump 4*bis* and second water heating means 5*bis*, but no brewing means.

As shown in FIG. 1, the outlet of water heating means 5*bis* is connected to first circuit C1 at a location that is downstream to brewing means 2 with respect to the water flow in said first circuit. As for first circuit C1, in addition to the water heater 5*bis*, further means to control the temperature of the water or of other edible liquids, can be provided, e.g. to cool the water or liquids.

To put it in other words, second circuit C2 is not provided with brewing means and is not involved with the extraction or brewing process that is carried out only in first circuit C1. The water or other edible liquid are provided by appropriate sources; in the case of water the source can be the same as for first circuit C1. The water from circuit C2 is preferably delivered to beverage collecting means 6, so as to exit said means with the beverage exiting brewing means 2 as a single flow.

Figure 6:
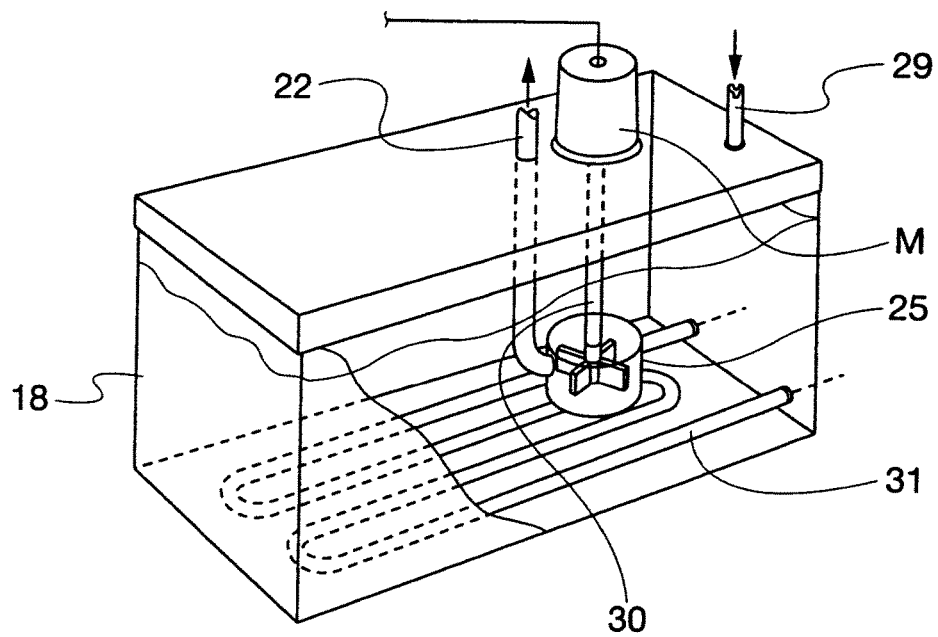
FIG. 6 is a schematic and perspective view of a preferred water heater for the second circuit.

In a preferred embodiment, shown in FIG. 6, the water heating means 5*bis* of second circuit C2 comprises a boiler that includes a pump 4*bis* in one device. In greater detail, the boiler comprises a tank 18, or similar suitable container, which is connected with the main water source 3 through duct 29. Water tank 18 is preferably directly connected to water source 3, also because flowmeter 8*bis* can be replaced by pump 21. Pump 21 is partially immersed in the water contained in the water tank 18 in order to supply water to the second circuit C2. The pump is an "immersed pump" of a type known per se in the art, e.g. from WO 2004045351. In the preferred embodiment shown in FIG. 6, pump 4*bis* comprises a shaft 30 that is actuated by motor M located outside the tank 18. Shaft 30 is provided with an impeller 19 and a casing 25 that has the shape of a cylinder open at its bottom. The impeller 19 is housed within the cylinder casing 25 and casing 25 is provided with only one exit duct 22 that is connected to circuit C2; upon rotating, the pump's impeller will send water from tank 18 into duct 22 and to the second circuit C2. The water tank 18 is provided in a way known per se with a resistance 31 for heating the water.

Controller unit 9 can operate motor M of pump 4bis to control the amount and the flow rate of water sent to circuit C2; because this circuit is virtually free from resistances, the water will arrive directly to beverage collecting means 6.

Preferably, the second circuit is operated to feed a preset amount of water to first circuit C1 after a flow of beverage leaving said brewing means has started and the water feeding is stopped earlier than or simultaneously with the stopping of the flow of beverage from brewing means 2. The flow rate in circuit C2 depends on the flow rate in circuit C1, both can be set to provide a almost simultaneous end of delivery of the water and beverage.

The hydraulic circuits C1 and C2 preferably comprise at least one type of means apt to detect and control the flow-rate of said primary solvent at the inlet of the pump, such as—for instance—a volumetric flow-control 8 and 8bis, and circuit C1 can be also provided with means to adapt said flow in order to alter it at the outlet level of the preparation chamber. These means can be easily found by the skilled in the art amongst standard commercial components such as by-pass valves, pressure-switches, tunable centrifugal pumping devices, piezo-electric valves, or controllable rotary pumps. Lastly said hydraulic system includes an outlet disposed immediately above the container for the finished drink or in its vicinity. Optionally the hydraulic outlet may comprise one additional unit utilising a Venturi-type of mixer to mix said liquid at outlet level with a steam-producing unit and air-intake of known type.

The dispensing unit comprises also an electrical circuit, preferably including an electronic controller 9 connected to it, apt to receive inputs from a user interface 12 (such as a touch-screen, push-buttons, membrane switches, voice-commands or other inputting commands available to the skilled in the Art). The electric circuit is also apt to monitor the hydraulic circuit particularly with respect to the temperature of the solvent, the time of operation of pumps 4 and 4bis via lines 11, the flow-rate at the inlet of the pump as read via said flow-meter 8 and 8bis through lines 10 and/or the pressure of said hydraulic circuit, as measured via a pressure meter 13 and line 14, or pressure switch, preferably located between pump 4 and heater 5 to detect the pressure in the brewing means; alternatively, pressure value may be inferred by taking into account the known characteristic curve of the pump used in said circuit.

The operation of C1 will be disclosed with reference to the preparation of e.g. a regular coffee, or "caffè americano" that is a coffee-based drink with a low concentration of the primary ingredient, in this case roasted and ground coffee, specifically that is 8.0 grams for 295 cc., or 36,875 cc. of solvent (water) per gram of main ingredient (coffee).

Example 1

Coffee is inserted in the preparation chamber 2 either via use of a pre-packaged container or in bulk, through metering means. The brewing means 2 outlet is closed and means 2 and hydraulic system C1 are then pressurised by activating the pump 4. The brewing sequence is therefore: pump activated, optional pressurised pre-brewing phase and subsequent opening of the brewing chamber activated, flow-meter controls detect flow.

After a delay which can be programmed, but that will be preferably between 0.5 and 20 seconds after the opening of the brewing chamber or, if absent, after the starting of the flow from the outlet spout, the secondary hydraulic system is activated. The flow-rate of this secondary system uses as controlling parameter the flow-rate of the first hydraulic system in the sense that its flow-rate will be dependant upon the flow-rate of the primary hydraulic system. Flow rates are detected through flow-rate meters 8 and 8bis (or the pump of FIG. 6 for C2) and controller 9 regulates flow rate in C2 according to the detected values in C1 to provide the required amount of water from C2 in the required time. Alternatively, the flow rates are pre-set in the machine instructions. Once the required amount of water is fed to the first circuit, pump 4bis is stopped.

According to an aspect of the present invention, on the basis of the beverage type and its final volume, i.e. the quantity of the final beverage to be dispensed, the amount of water supplied by the first and the second circuits C1 and C2 is predetermined also according to the aroma, and in general to the organoleptic characteristics of the final beverage.

In fact, it is clear that according to a lesser or a greater amount of water passing through the beverage ingredient inside the brewing chamber supplied by the first circuit C1, with respect to the water supplied by the second circuit C2, the aroma and taste of the final beverage will be different.

Usually, for each beverage type, i.e. coffee, American coffee, one or more predetermined set of values of the percentage (quantity) of water supplied by the first circuit C1 and the water supplied by the second circuit C2 are stored in the control means 9 of the device according to the present invention. The predetermined set of values takes into account the type of beverage to be dispensed. The following table shows an example of predetermined set of values of the water supplied by the first and second circuits for an American type coffee with a final volume of 250 ml.

TABLE 1

| volume from C1 (coffee) | volume from C2 (water) | final volume (mix) |
| --- | --- | --- |
| 20 | 230 | 250 |
| 30 | 220 | 250 |
| 60 | 190 | 250 |
| 80 | 170 | 250 |

For an amount of coffee within the range of 7.0 to 8.5 grams, the preferred range of coffee beverage is 20 to 80 ml, preferably 30 to 60 ml and a total final volume of the beverage of 230-280 ml, preferably about 250 ml.

The flow rate of the first and second circuit C1 and C2 for supplying the desired quantity of water respectively from the first and second circuits can be constant during the dispensing time or can be varied during the dispensing time according to different laws or algorithm.

In particular, the flow rates $fr_1$ and $fr_2$ can be controlled in order to balance eventual unexpected differences in the flow rate of the primary circuit, thus maintaining the required balance between the amount of liquid dispensed by the two circuits and the time of dispensing of both circuits. The control algorithm may also require the second circuit C2 to change its flow rate during the time required for the dispensing of the full pre-programmed amount of liquid of the primary circuit.

In other words, the predetermined quantity of water supplied by the first circuit C1 and the second circuit C2, according to the predetermined percentage (quantity), can be supplied at a constant flow rate or at a variable flow rate, for example by increasing or decreasing the ratio between them, for example in the initial or in the last part of the dispensing procedure.

According to an aspect of the present invention, the first circuit C1 flow rates ($fr_1$) and second circuit C2 flow-rate ($fr_2$) are made interdependent according to different relationships between said flow-rate values.

The relationship between first circuit C1 flow-rate ($fr_1$) and second circuit C2 flow-rate ($fr_2$) will in general be:

$$fr_2 f(fr_1)$$

whereby this function will be parametered accordingly to the desired type of drink, for instance coffee, to be prepared.

As the drink's liquid content is usually pre-determined by appropriate programming means available to the skilled person, the finished drink will be defined as a total volume e.g. in cc. or fluid oz. with pre-determined quantity of liquid dispensed by the primary and secondary circuit.

Once a ratio of volume content from the two separate circuits has been set in relation to the final volume of the beverage, including atypical cases setting off responses from the controller, it is possible to draw the list of drinks having differing tastes using the two separate circuits and the ample palette of organoleptic and visual results that such construction is suitable to provide.

More specifically, in one instance such relationship between $fr_1$ and $fr_2$ will be kept constant during the dispensing time. This can be useful within the range of liquid contents of the target drink, in brewing cycles using ingredients where either the depletion of the soluble contents is limited or not unfavourable to the taste, or the ingredient has suitable characteristics for such dispensing cycle with linear, non discrete dilution ratios so that the taste is not evidently affected (and the required drink's taste is particularly strong).

In other cases the relationship between $fr_1$ and $fr_2$ can be linear with either a positive or negative correlation between the two flow-rates, i.e. the ratio between the volumes dispensed in the first and second circuits, increases or decreases linearly during the dispensing time.

Furthermore, the relationship between first circuit C1 flow-rate ($fr_1$) and second circuit C2 flow-rate ($fr_2$) may be changed in the course of the drink dispensing operation.

For instance a typical dispensing drink may be composed of different ratios between $fr_1$ and $fr_2$ as follows: the start of the primary circuit does not trigger the start of the secondary circuit until a programmable interval has elapsed from the start. After such interval of time, the second circuit C2 starts, using a fixed ratio of the first circuit C1 flowrate as reference for adjusting its own flowrate. This ratio will be a ratio between 0.5 and 10, preferably between 2 and 6.

After a second fixed interval has elapsed, such interval measured in dispensed cc or elapsed time or an algorithm using both values, the fixed ratio between the two flowrates of the two circuits can change to a different value which may be between 2 and 20, preferably between 3 and 10.

In a different instance, where the coffee drink should be particularly mild and aromatic, the relationship between $fr_1$ and $fr_2$ will be diverting from linear towards an exponential type, so that the two flow-rates will be positively correlated and the curve of the $fr_1/fr_2$ ratio will show an exponential-type function.

In the instance of a more pungently aromatic and even stronger type of beverage, the curve of $fr_1$ and $fr_2$ ratio during the dispensing time could show a logarithmic-type function and the dispensing cycle shall be truncated at a pre-programmed liquid content, that is dilution ratio, so that the drink will show the preferred pungent, strong flavour.

Moreover, it is also possible that the flow-rate of the primary ingredient's circuit changes during each dispensing cycle in an un-forecastable manner from one cycle to the other depending either on specific parameters of the type of hydraulic system used or different conditions in the preparation chamber where the ingredient is located for extraction of its soluble components.

This may be different volume of ingredient and/or grinding thinness or granulometry, or compacting of the ingredient cake, and in general such change will be so that it has an impact in the beverage output, i.e. on the expected flowrate in circuit C1.

In such instance the second circuit C2 flowrate is varied in order to compensate the change, by adapting its flowrate $fr_2$ to follow the primary circuit's flowrate $fr_1$.

There are two instances, in such situation: that the flow rate of the primary circuit $fr_1$ is unexpectedly slow, thus the secondary circuit's flow rate $fr_2$ will slow itself down accordingly, or it is too fast, thus $fr_2$ will speed up. In both cases respectively a minimum and a maximum flowrate threshold value will be implemented in the controller's software, so that if fr1<min threshold value (threshold being flowrates usually within 0.8 to 1.5 ml/sec), the dispensing system will indicate a faulty dispensing cycle.

In the other case, if fr1>max. threshold value (threshold being flowrates usually not lower than 2.0 ml./sec), the controller will feedback the information to the primary circuit thus reducing fr1 in order to re-establish the required ratio between the two flow rates.

Although it is explicitly mentioned that water is used as the brewing and additional liquid in the first and second circuits C1 and C2, other suitable liquids can be used, such as a liquid ingredient, for example milk, can be dispensed by said second circuit C2.

In the preferred embodiment, to obtain excellent extraction of the starting materials, the brewing means are of the type that open only after pressure in the capsule has built up to a value high enough to extract the coffee or other ingredient; usually, the opening pressure is higher than 6 bars, preferably about 8-10 bars and in the known embodiments of this type the following beverage dispensing step is generally carried out at a similar high pressure. This high dispensing pressure results in froth formation in the obtained beverage, that is appreciated in e.g. espresso coffees.

According to a preferred aspect of the exemplary embodiment, means are provided to lower the remaining pressure in the circuit after the beverage has been fully dispensed, before the dispensing apparatus is open, e.g. to replace the exhausted capsule. A suitable arrangement of said means is shown in FIG. 7 and comprises an exhaust valve 23, preferably a three way valve, connected to a discharge line 28. Valve 23 is located downstream of pump 4, between the pump and water heating means 5 in first circuit C1 in order to depressurize it by discharging the fluid remaining in the circuit after the beverage has been dispensed.

As above mentioned, some beverages do not require froth. To reduce or avoid froth formation in the beverage, pressure reducing means are provided, to maintain the brewing means at a required reduced pressure, lower than the pressure necessary for the opening of the brewing means.

As previously mentioned, according to a preferred embodiment of the invention, the first circuit C1, i.e. where the beverage is brewed, comprises means to maintain a constant pressure, lower than a preset value, in the brewing means 2 at least after the beverage started to exit the brewing means 2, in order to avoid or reduce the formation of froth (or cream) at the top of the obtained beverage. To this purpose, the beverage dispensing pressure is usually maintained between 0.5 and 5 bars, preferably between 1.5 and 3.5 bars, and most preferably around 2.5 bars and in any case lower than the opening pressure of the brewing means.

Figure 2:
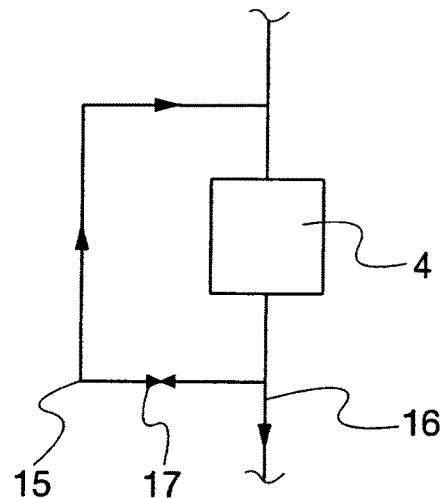
FIG. 2 is an enlarged view of a scheme portion of the invention machine.
Figure 5:
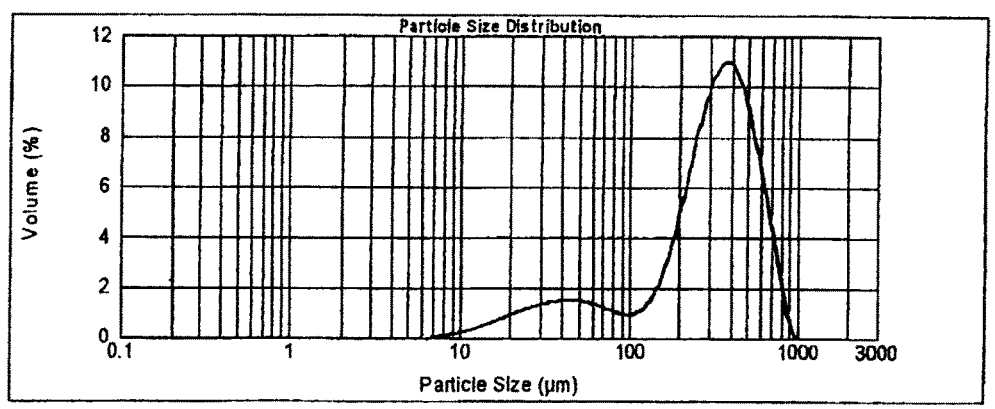
FIG. 5 is a graph showing a preferred granulometry of the ground coffee to be used in the invention.

In the embodiment shown in FIGS. 1 and 2, the pressure maintaining means are formed by a branched line 15 that leaves the circuit line 16 downstream of pump 4 and that is again connected to line 16 upstream of pump 4, with respect to the water flow. Alternatively, as shown with the dotted line in FIG. 1, branched line 15 can be connected to water reservoir 3. A valve 17 is provided on line 15, this valve is set to open when the required pressure is reached, so as to limit the pressure in the brewing chamber to the value set on valve 17. According to the present invention, the pressure is usually maintained between 0.5 and 5 bars, preferably between 1.5 and 3.5 bars, and most preferably around 2.5 bars.

Other pressure maintaining and limiting means are available to perform the same function; as an example, pressure sensor 13 can be used to operate pump 4 through controller unit 9 and lines 11 and 14, so as to stop the pump when the desired pressure is reached and to activate again the pump once the pressure has dropped below the desired level.

In a first case, pressure reducing and maintaining means are activated to control a frothless brewing, hence pressure is maintained lower than a pre-fixed threshold which can be programmed accordingly to the specific needs. Preferably, after a programmable delay from the brewing means opening, which can be determined by a command instruction either pre-programmed or inserted by the end-user of the machine, pressure reducing means are activated and pressure is maintained at the required value to avoid froth formation.

The above discussed arrangement can also be used to maintain a constant pre-brewing pressure in the closed capsule or brewing chamber before the opening of the brewing means. This pressure will be lower than the opening pressure for the brewing means and as high as possible in order to maximize the extraction of aromas from the ground coffee or other ingredient without causing the opening of the brewing means 2.

It was found that a combination of the pressure maintaining means with the second circuit results in the possibility of obtaining a beverage with excellent taste and very little froth or no froth at all; this applies for coffee and other ingredients as well, as hereinafter exemplified with tea.

Example 2

Minced tea leaves are loaded in the preparation chamber 2 either via a pre-packaged container such as the mentioned capsules, or in bulk, appropriately metered. As soon as the preparation is sealed via apt sealing means and circuit C1 is put under pressure by the primary hydraulic system, said system introduces pressure-reducing means (such as by-pass valves operated via solenoid valves, piezo-electric valves) to maintain a constant pressure inside said chamber 2. After a programmable delay, preferably not shorter than 1 second and not longer than 20 seconds, during which the operating pressure is kept constant below the threshold needed to open the chamber 2 outlet (or the preferred opening pressure if a valve is used to open the brewing chamber), said pressure is raised above such threshold so that the preparation chamber is opened and normal brewing is initiated.

After a delay which can be programmed between zero and 30 seconds, but that will be preferably between 0.5 and 15 seconds after the opening of the brewing chamber (or, if this is not applicable, after the starting of the flow from the outlet spout) the secondary hydraulic system is activated, from here onwards following what described in the first embodiment.

Summarizing, in a first embodiment the operation of the dispensing machine involves feeding water to the brewing means 2 to open the brewing means at time $t_{op}$ and start dispensing the beverage, reducing the dispensing pressure at time $t_{bp}$ to avoid froth formation and maintaining said pressure reduced until the end of the beverage elution step, dispensing at time $t_{C2}$ a second flow of water or edible liquid from the second circuit C2 to the first circuit to reach the required beverage volume.

The dispensing of the second flow is started after the brewing means are opened.

Figure 3:
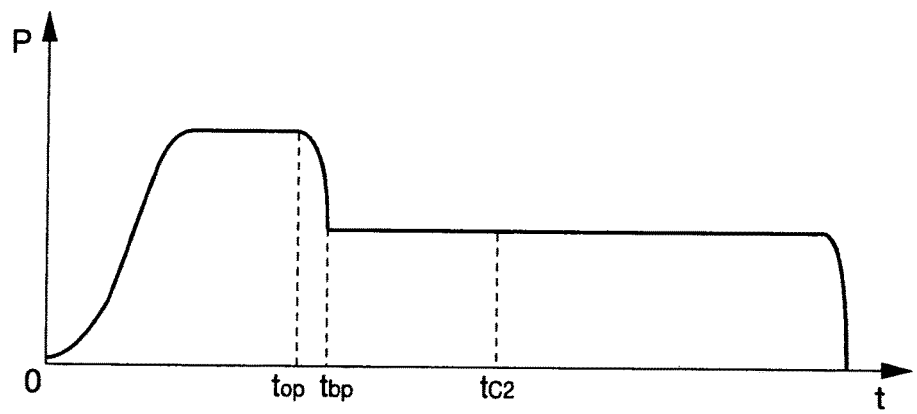
FIGS. 3 and 4 are graphs showing examples of the pressure variations during the invention process.

This embodiment is shown in FIG. 3.

Figure 4:
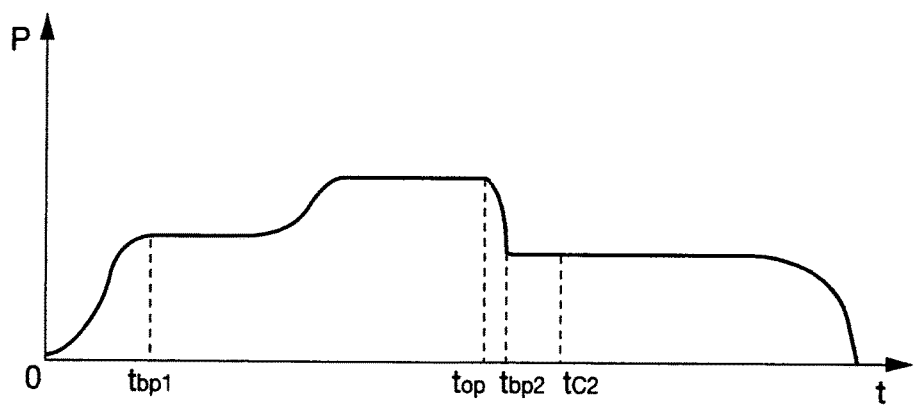

FIG. 4 shows another embodiment of the invention: in this embodiment, water is fed to the brewing means until a pressure lower that the opening pressure is reached at time $t_{bp1}$, said pressure is maintained for a preset time to increase the extraction of the aromas from the ground coffee. Then the pressure in the brewing means is increased to open them and to start the beverage dispensing at time $t_{op}$; to avoid froth forming, pressure in the brewing means is reduced again at time $t_{bp2}$, e.g. to a value 2.5 to 3.0 bars, and this value is maintained to the end of the dispensing step. As above mentioned, the second hydraulic circuit is operated at time $t_{C2}$ to feed to the beverage collecting means 6 or 7 enough water to reach the desired volume for the beverage. The pressure at $t_{bp2}$ can be lower than the first used reduced pressure at $t_{bp1}$. In case a "short" beverage is required, e.g. an espresso, the second circuit C2 is not activated and the pressure reducing and maintaining means are activated only before the opening of the brewing means 2, to enhance extraction and froth formation.

The invention claimed is:
1. A beverage dispensing machine comprising:
   a first hydraulic circuit including a water source, first water heating means, a first pump located upstream with respect to the first water heating means, a brewing means, the brewing means including inlet and outlet means, beverage collecting means for collecting brewed beverage leaving the brewing means, the beverage collecting means including an outlet for dispensing the brewed beverage from the first hydraulic circuit to a container;
   a second hydraulic circuit that includes second water heating means and a second pump located upstream with respect to the second water heating means, the second water heating means being different and separate from the first water heating means of the first hydraulic circuit; and
   an electronic controller configured to change a temperature of the first hydraulic circuit with respect to a temperature of the second hydraulic circuit and to adapt both temperatures and volumes of liquids dispensed by the first and second hydraulic circuits according to a required taste of the brewed beverage;
   wherein an outlet of the second water heating means is connected to the first hydraulic circuit at a location that is downstream to the brewing means with respect to water flow in the first hydraulic circuit.

2. The beverage dispensing machine according to claim 1, wherein the electronic controller is configured to operate the second hydraulic circuit as a function of a flow-rate of the first hydraulic circuit.

3. The beverage dispensing machine according to claim 2, wherein the electronic controller is configured to control a flow-rate of said second hydraulic circuit according to a detected value of the flow-rate of the first hydraulic circuit so that a pre-determined relationship is maintained between the flow-rate of said first hydraulic circuit and the flow-rate of said second hydraulic circuit.

4. The beverage dispensing machine according to claim 3, wherein the pre-determined relationship maintained between the flow-rate of the first hydraulic circuit and the flow-rate of the second hydraulic circuit is selected at least from constant, linear, exponential, or logarithmic functions.

5. The beverage dispensing machine according to claim 1, wherein the second water heating means comprises a tank, and a third pump partially immersed in water contained in the tank.

6. The beverage dispensing machine according to claim 1, further comprising:
means to maintain a constant pressure of the water in the brewing means, the constant pressure being lower than an opening pressure of the brewing means.

7. The beverage dispensing machine according to claim 6, wherein the means to maintain the constant pressure includes a branched line and a valve on the branched line, and the branched line branches from the first hydraulic circuit downstream of the first pump.

8. The beverage dispensing machine according to claim 7, wherein the branched line reconnects to the first hydraulic circuit upstream of the first pump.

9. The beverage dispensing machine according to claim 1, wherein the second hydraulic circuit does not include a separate brewing means from the brewing means of the first hydraulic circuit.

10. The beverage dispensing machine according to claim 1, wherein the second hydraulic circuit is configured to feed a preset amount of water to the first hydraulic circuit after a flow of beverage leaving the brewing means has started, and wherein the water feeding is stopped earlier than or simultaneously with stopping of a flow of the brewed beverage from the brewing means.

11. The beverage dispensing machine according to claim 1, wherein the first water heating means includes first boiler or heater and the second water heating means includes a second boiler.

12. The beverage dispensing machine according to claim 1, wherein the brewing means includes a capsule or brewing chamber.

13. The beverage dispensing machine according to claim 1, further comprising a first flow-meter positioned upstream of the first pump and connected to the electronic controller.

14. The beverage dispensing machine according to claim 1, further comprising a second flow-meter positioned upstream of the second pump and connected to the electronic controller.

15. The beverage dispensing machine according to claim 1, wherein the second hydraulic circuit is connected to the first hydraulic circuit at the beverage collecting means such that water from the second hydraulic circuit is delivered to the beverage collecting means and dispensed therefrom with the brewed beverage from the brewing means.

16. The beverage dispensing machine according to claim 15, wherein the beverage collecting means includes at least one of a filter and an insert to extend a path of the brewed beverage configured to reduce froth in the brewed beverage before the dispensing of the brewed beverage to the container.

17. The beverage dispensing machine according to claim 1, wherein the beverage collecting means includes at least one of a filter and an insert to extend a path of the brewed beverage configured to reduce froth in the brewed beverage before the dispensing of the brewed beverage to the container.

18. The beverage dispensing machine according to claim 1, wherein the outlet of the beverage collecting means is positioned on a bottom of the beverage collecting means and the beverage collecting means is connected to the brewing means on an opposite side from the bottom of the beverage collecting means.

19. A beverage dispensing machine comprising:
a first hydraulic circuit including a water source, first water heating means, a first pump located upstream with respect to the first water heating means, a brewing means, the brewing means including inlet and outlet means, and beverage collecting means for collecting brewed beverage leaving the brewing means and for dispensing the brewed beverage to a container, the beverage collecting means being directly connected to the brewing means;
a second hydraulic circuit that includes second water heating means and a second pump located upstream with respect to the second water heating means, the second water heating means being different and separate from the first water heating means of the first hydraulic circuit;
wherein an outlet of the second water heating means is connected to the first hydraulic circuit at a location that is downstream to the brewing means and upstream from an outlet of the beverage collecting means with respect to water flow in the first hydraulic circuit, and
wherein the second hydraulic circuit is connected to the first hydraulic circuit at the beverage collecting means such that water from the second hydraulic circuit is delivered to the beverage collecting means and dispensed therefrom with the brewed beverage from the brewing means.

20. The beverage dispensing machine according to claim 19, wherein the beverage collecting means includes at least one of a filter and an insert to extend a path of the brewed beverage configured to reduce froth in the brewed beverage before the dispensing of the brewed beverage to the container.

* * * * *